(12) United States Patent
Tzomik et al.

(10) Patent No.: US 10,197,935 B2
(45) Date of Patent: Feb. 5, 2019

(54) LIQUID ELECTROPHOTOGRAPHIC COMPOSITION

(71) Applicant: HP Indigo B. V., Amstelveen (NL)

(72) Inventors: Inna Tzomik, Modiin (IL); Hannoch Ron, Kadima (IL); Daniel Skvirsky, Nes Ziona (IL); Einat Glick, Nes Ziona (IL)

(73) Assignee: HP Indigo B.V., Amstelveen (NL)

( * ) Notice: Subject to any disclaimer, the term of this patent is extended or adjusted under 35 U.S.C. 154(b) by 0 days.

(21) Appl. No.: 15/536,076

(22) PCT Filed: Jan. 19, 2015

(86) PCT No.: PCT/EP2015/050870
§ 371 (c)(1),
(2) Date: Jun. 14, 2017

(87) PCT Pub. No.: WO2016/116130
PCT Pub. Date: Jul. 28, 2016

(65) Prior Publication Data
US 2018/0267419 A1    Sep. 20, 2018

(51) Int. Cl.
| | |
|---|---|
| *G03G 9/09* | (2006.01) |
| *G03G 9/097* | (2006.01) |
| *C09D 11/32* | (2014.01) |
| *G03G 15/10* | (2006.01) |
| *G03G 9/12* | (2006.01) |
| *G03G 9/13* | (2006.01) |

(52) U.S. Cl.
CPC ........... *G03G 9/0926* (2013.01); *C09D 11/32* (2013.01); *G03G 9/097* (2013.01); *G03G 9/122* (2013.01); *G03G 9/131* (2013.01); *G03G 15/10* (2013.01)

(58) Field of Classification Search
CPC ...... G03G 9/0926; G03G 9/122; G03G 9/097; G03G 15/10; G03G 9/131; C09D 11/32
See application file for complete search history.

(56) References Cited

U.S. PATENT DOCUMENTS

| | | | |
|---|---|---|---|
| 3,235,560 | A | 2/1966 | Kaveggia et al. |
| 3,772,199 | A | 11/1973 | Tamai et al. |
| 3,956,630 | A | 5/1976 | Mellows |

(Continued)

FOREIGN PATENT DOCUMENTS

| | | |
|---|---|---|
| EP | 1594011 | 11/2005 |
| EP | 1843212 | 10/2007 |

(Continued)

OTHER PUBLICATIONS

"SpecMetrix In-line Coating Measurement Systems Win 2014 ICE Asia Innovation Award" Business Wire, 2014, 2 pages, http://www.businesswire.com/news/home/20140925005974/en/SpecMetrix-In-line-Coating-Measurement-Systems-Win-2014#.VJATYiuUel0.

(Continued)

*Primary Examiner* — Thorl Chea
(74) *Attorney, Agent, or Firm* — HP Inc. Patent Department (57) ABSTRACT

A liquid electrophotographic composition is described, which comprises a carrier liquid, a polymer resin comprising a copolymer of an alkylene monomer and a monomer selected from acrylic acid and methacrylic acid, and at least 5 wt. % of an optical brightening agent based on the total solids content of the composition.

14 Claims, 2 Drawing Sheets

(56) References Cited

U.S. PATENT DOCUMENTS

| | | | |
|---|---|---|---|
| 6,376,147 B1* | 4/2002 | Bonsignore | G03G 9/122 430/114 |
| 6,566,024 B1 | 5/2003 | Bourdelais et al. | |
| 6,664,017 B1* | 12/2003 | Patel | G03G 9/0902 430/10 |
| 7,245,843 B2 | 7/2007 | Bessho | |
| 7,616,910 B2 | 11/2009 | Bessho | |
| 7,894,732 B2 | 2/2011 | Denton et al. | |
| 8,565,628 B2 | 10/2013 | Henderson | |
| 8,609,315 B2 | 12/2013 | Yoshida et al. | |
| 8,626,012 B2 | 1/2014 | Yoshioka | |
| 8,634,108 B2 | 1/2014 | Kojima et al. | |
| 8,656,528 B2 | 2/2014 | Perelman et al. | |
| 8,728,696 B2 | 5/2014 | Yamada et al. | |
| 8,749,845 B2 | 6/2014 | Kuo et al. | |
| 8,755,699 B2 | 6/2014 | Kuo et al. | |
| 8,760,719 B2 | 6/2014 | Tyagi et al. | |
| 8,781,353 B2 | 7/2014 | Regelsberger et al. | |
| 8,805,217 B2 | 8/2014 | Kuo et al. | |
| 2008/0233313 A1 | 9/2008 | Chatow et al. | |
| 2009/0104373 A1 | 4/2009 | Vanbesien et al. | |
| 2009/0238616 A1 | 9/2009 | Ciaschi | |
| 2009/0239174 A1 | 9/2009 | Inaba et al. | |
| 2010/0291474 A1 | 11/2010 | Baran, Jr. | |
| 2010/0330487 A1 | 12/2010 | Veregin et al. | |
| 2011/0002704 A1 | 1/2011 | Fujita | |
| 2011/0003245 A1 | 1/2011 | Pohlt | |
| 2011/0007359 A1 | 1/2011 | Yamakawa et al. | |
| 2011/0212326 A1 | 9/2011 | Ettrich et al. | |
| 2011/0274896 A1 | 11/2011 | Krames et al. | |
| 2012/0201559 A1 | 8/2012 | Holland | |
| 2013/0259501 A1 | 10/2013 | Regelsberger et al. | |
| 2014/0341601 A1 | 11/2014 | Miyazaki | |

FOREIGN PATENT DOCUMENTS

| | | |
|---|---|---|
| WO | WO-96/31808 | 10/1996 |
| WO | WO-99/61955 | 12/1999 |
| WO | WO-0188619 | 11/2001 |
| WO | WO-2007/130559 | 11/2007 |
| WO | WO-2013/043780 | 3/2013 |

OTHER PUBLICATIONS

"Applications for the Paper Industry: SPECTRO PHOENIX II Measures the Thickness of Silicon Coatings", SPECTRO Analytical Instruments, 2014, 2 pages, http://www.spectro.com/pages/e/p060103.htm.

International Search Report and Written Opinion for International Application No. PCT/EP2015/050870 dated Sep. 29, 2015, 10 pages.

* cited by examiner

LIQUID ELECTROPHOTOGRAPHIC COMPOSITION

BACKGROUND

Digital printing involves technologies in which a printed image is created directly from digital data, for example using electronic layout and/or desktop publishing programs. Known methods of digital printing include full-color ink-jet, electrophotographic printing, laser photo printing, and thermal transfer printing methods.

Electrophotographic printing techniques involve the formation of a latent image on a photoconductor surface mounted on an imaging plate. The latent image is developed using either a dry toner (a colorant mixed with a powder carrier) or a liquid ink (a suspension of a colorant in a liquid carrier). The toner or ink generally adheres to the substrate surface with little penetration into the substrate. The quality of the final image is largely related to the size of the particles, with higher resolution provided by smaller particles. Dry toners used in solid electrophotography are fine powders with a relatively narrow particle size distribution that are expelled from fine apertures in an application device. Coloured liquid inks used in liquid electrophotography are generally comprised of pigment- or dye-based thermoplastic resin particles suspended in a non-conducting liquid carrier, generally a saturated hydrocarbon.

Colourless or transparent liquid compositions which do not contain any pigment or dye have also been developed to be used in electrophotographic printing, and can be used to provide a glossy appearance to a printed article.

DETAILED DESCRIPTION

It is to be understood that this disclosure is not limited to the particular materials and process steps disclosed herein because such materials and process steps may vary somewhat. It is also to be understood that the terminology used herein is used for the purpose of describing particular examples only. The terms are not intended to be limiting because the scope of the present disclosure is intended to be limited only by the appended claims and equivalents thereof.

It is noted that, as used in this specification and the appended claims, the singular forms "a," "an," and "the" include plural referents unless the context clearly dictates otherwise.

As used herein, "liquid electrophotographic composition" generally refers to a liquid composition having a carrier liquid, a polymer resin and an optical brightening agent suitable for printing in an electrophotographic composition. Accordingly, a liquid electrophotographic composition may further comprise a mixture of a variety of different agents or additives, including without limitation, surfactants, organic solvents and co-solvents, charge control agents, viscosity modifiers, sequestering agents, stabilizing agents, and anti-coagulation agents. Though not part of the liquid electrophotographic composition per se, in addition to the optical brightening agent, the composition may include a dispersant for the optical brightening agent and can further carry solid additives such as additional resins, latexes, UV curable materials, plasticizers, salts, charge control agents, etc.

Unless stated otherwise, "liquid electrophotographic composition" or "printed electrophotographic composition" as described herein is to be understood to mean a liquid composition which does not contain any pigment and so appears transparent to the naked eye under normal light when applied on a substrate. The liquid electrophotographic compositions described herein may be referred to as non-pigmented liquid electrophotographic compositions, or as transparent liquid electrophotographic compositions, which are to be understood as being interchangeable. Similar definitions may be applied to the optical brightening agent.

As used herein, "carrier liquid" or "liquid vehicle" refers to the fluid in which the optical brightening agent and polymer resin of the present disclosure can be dispersed. Such a carrier liquid can be formulated for electrophotographic printing so that the electrophotographic composition has a viscosity and conductivity for such printing.

As used herein, "co-solvent" refers to any solvent, including organic solvents, present in the liquid electrophotographic composition.

As used herein, "optical brightening agent" generally refers to a molecule which absorbs UV light between 380 and 270 nm and emits light at 420 to 500 nm, i.e. a fluorescent molecule. Fluorescent molecules are those which absorb light or other electromagnetic radiation and emit longer wavelength electromagnetic radiation. Such optical brightening agents are known and are used to increase the perception of brightness or whiteness of papers, textiles, plastics and other materials. As used herein, "optical brightening agent" is to be understood as referring to the class of fluorescent molecules which are colourless (i.e. white), or only weakly coloured in the solid state or in solution, and which are distinct to fluorescent dyes which appear coloured to the naked eye.

As used herein, the fluorescence profile of the optical brightening agent refers to the difference between the fluorescence emission of a substrate and the fluorescence emission of a liquid electrophotographic composition as described herein printed on that same substrate.

As used herein, "substituted" or "derivatized" means that a hydrogen atom of a compound or moiety is replaced by another atom such as a carbon atom or a heteroatom, which is part of a group referred to as a substituent. Substituents include, for example, alkyl, alkoxy, aryl, aryloxy, alkenyl, alkenoxy, alkynyl, alkynoxy, thioalkyl, thioalkenyl, thioalkynyl, thioaryl, sulfonyl, sulfuryl, sulfinyl etc.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, the term "substantially" or "substantial" refers to the complete or nearly complete extent or degree of an action, characteristic, property, state, structure, item, or result.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

Measurement of coat thickness or coat weight of pigmented electrophotographic inks for quality control and process efficiency purposes is possible based on the color density of the printed ink. However, since transparent electrophotographic compositions are non-pigmented, it is not possible to determine coat thickness or coat weight of these transparent compositions in this manner.

It has been recognised that inclusion of a liquid electrophotographic composition comprising an optical brightening agent as described herein into a transparent or non-pigmented liquid electrophotographic composition allows an in-line determination of thickness or coat weight of the printed composition based on the fluorescence profile of the composition comprising the optical brightening agent. In one example, the liquid electrophotographic composition described herein is added to a transparent or non-pigmented liquid electrophotographic composition for the purposes of calibrating a print apparatus so that a desired coat weight of the transparent composition is printed. Once the apparatus has been calibrated, the transparent or non-pigmented liquid electrophotographic composition can be printed onto a print substrate without inclusion of the optical brightening agent containing composition.

Thus, the present disclosure is directed to liquid electrophotographic compositions and methods. That being understood, it is noted that when discussing the present compositions and associated methods, each of these discussions can be considered applicable to each of these examples, whether or not they are explicitly discussed in the context of that example. For example, in discussing a carrier liquid for use in a liquid electrophotographic composition, such a carrier liquid is to be understood as being used in a method of making the liquid electrophotographic composition.

The present disclosure provides a liquid electrophotographic composition, comprising:
  a carrier liquid;
  a polymer resin comprising a copolymer of an alkylene monomer and a monomer selected from acrylic acid and methacrylic acid; and
  at least 5 wt. % of an optical brightening agent based on the total solids content of the composition.

The liquid electrophotographic composition may be a non-pigmented, transparent or colourless liquid electrophotographic composition. The optical brightening agent may be a non-pigmented or colourless optical brightening agent.

Additionally the present disclosure provides a method of manufacturing a liquid electrophotographic composition as described herein, comprising grinding a carrier liquid; a polymer resin comprising a copolymer of an alkylene monomer and a monomer selected from acrylic acid and methacrylic acid; and an optical brightening agent, to form the liquid electrophotographic composition.

Additionally the present disclosure provides a use of a liquid electrophotographic composition as described herein for determining the coat weight of a printed electrophotographic composition.

The present compositions and uses allow for an inline determination and calibration of a printed transparent, colourless or non-pigmented liquid electrophotographic composition based on the fluorescence profile of the optical brightening agent.

Described herein are compositions useful in methods of determining coat weight of a printed transparent electrophotographic composition, for example by calibrating a printing apparatus. The printing apparatus may be any printing apparatus suited for electrophotographic printing, for example the HP Indigo series of printers.

The liquid electrophotographic compositions described herein comprise a carrier liquid. The optical brightening agent may be substantially insoluble in the carrier liquid. The optical brightening agent may be completely insoluble in the carrier liquid. Generally, the carrier liquid comprises substituted or unsubstituted, linear or branched, aliphatic compounds. The carrier liquid may include aryl substituents. In one example, the carrier liquid can be substantially nonaqueous, i.e. containing less than 0.5% water. In another example, the carrier liquid can be nonaqueous. The carrier liquid can comprise a member selected from the group of paraffins, Isopar™affins, oils, alkanes having from about 6 to about 100 carbon atoms, and mixtures thereof.

As such, the carrier liquid can comprise, or substantially comprise, or even consist essentially of Isopar™affins, such as or equivalent to the ISOPAR™® high-purity Isopar™affinic solvents with narrow boiling ranges marketed by Exxon Mobil Corporation (Fairfax, Va., USA).

The liquid electrophotographic composition may comprise a cosolvent, such as one or more alkanes having from about 6 to about 14 carbon atoms, for example solvents sold under the NORPAR® (NORPAR® 12, 13 and 15) tradename available from Exxon Mobil Corporation (Fairfax, Va., USA). Other hydrocarbons for use as a carrier liquid, or cosolvent, are sold under the AMSCO® (AMSCO® 460 and OMS) tradename available from American Mineral Spirits Company (New York, N.Y., USA), under the SOLTROL® tradename available from Chevron Phillips Chemical Company LLC (The Woodlands, Tex., USA) and under the SHELLSOL® tradename available from Shell Chemicals Limited (London, UK). Such a carrier liquid, or cosolvent, can have desirable properties such as low odor, lack of color, selective solvency, good oxidation stability, low electrical conductivity, low skin irritation, low surface tension, superior spreadability, narrow boiling point range, non-corrosive to metals, low freeze point, high electrical resistivity, low surface tension, low latent heat of vaporization and low photochemical reactivity.

The liquid electrophotographic compositions described herein include a resin. The resin may comprise a copolymer of ethylene acrylic acid, ethylene methacrylic acid, ethylene acrylic ester maleic anhydride, ethylene acrylic ester glycidyl methacrylate, maleic anhydride, styrene maleic anhydride, and mixtures thereof.

The polymer resin can be selected from resins such as ethylene-vinyl acetate(EVA) copolymers; copolymers of ethylene and an ethylenically unsaturated acid of either acrylic acid and methacrylic acid; copolymers of ethylene, acrylic or methacrylic acid/alkyl ester of methacrylic or acrylic acid; polyethylene; polystyrene; crystalline polypropylene; ethylene ethyl acrylate; ethylene methacrylic acid copolymers which are partially neutralized with metal ions (e.g. Zn, Na, Li) such as SURLYN® ionomers;

acid modified ethylene vinyl acetate terpolymer or blends thereof; polyesters; polyvinyl toluene; polyamides; styrene/butadiene copolymers; combinations thereof; and blends thereof. The polymer resin may be a copolymer of ethylene and an ethylenically unsaturated acid of either acrylic or methacrylic acid; an ionomer of ethylene methacrylic acid copolymer; an ester of ethylene methacrylic acid copolymer and an acid modified ethylene vinyl acetate terpolymer; combinations thereof; and/or blends thereof. The polymer resin may be a NUCREL® polymer, such as NUCREL® 925, NUCREL® 2906, NUCREL® 2806, NUCREL® 960, NUCREL® 699 or NUCREL® 599.

The polymer resin may include polymers such as polyamines and polyamides. The resin may be a homopolymer or a copolymer of polyvinyl pyrrolidone. The resin may be a copolymer of polyvinyl pyrrolidone. Examples of monomers polymerized with vinyl pyrrolidone in order to form polyvinyl pyrrolidone copolymers include, but are not limited to, alkylmethacrylates-acrylates such as butylmethacrylates, methylmethacrylates and the like. Illustrative examples of polyvinyl pyrrolidones polymers include, for example, styrene/butylmethacrylate/vinyl pyrrolidone terpolymers, vinyl pyrrolidone/vinyl acetate copolymers, vinyl pyrrolidone homopolymers, and the like. The resin may be a vinyl pyrrolidone/triacontene copolymer (a copolymer of vinylpyrrolidone grafted with triacontene). The resin may be 2-pyrrolidinone 1-ethenyl triacontene polymer.

The resin may be a polyvinyl pyridine polymer or copolymer such as polyvinyl pyridine co-styrene or polyvinyl pyridine co-butyl methacrylate. The resin may be an amino terminated polyacrylate such as poly(t-butyl amino ethyl methacrylate) or poly(dimethyl amino ethyl methacrylate). The resin may be a polymer or copolymer selected from the group consisting of polyethylene imine; polyethylene oxide diamine terminated; polypropylene oxide, monoamine or di-amine terminated; polyamide; polydimethyl siloxane diamino propyl terminated; ethylene/butylene copolymer mono and dihydroxy terminated; hydroxyl ethyl cellulose.

Exemplary embodiments of the resin of the present disclosure include Antaron® WP-660 wax resin, a copolymer available from International Specialty Products and Alcyn® 575 wax resin, a copolymer available from Honeywell Inc.

The resin can encapsulate the optical brightening agent during grinding or mixing to create a fluorescent particle. The fluorescent particle can have a final particle size from about 1 micron to about 10 microns.

In some examples, the resin may represent from about 1 to about 99 weight percent (wt %) of the total amount of solids present in the composition, i.e. wt % of total weight of non volatile substances (NVS). In some other examples, resin may represent from about 25 to about 80 wt % of the total amount of solids present in the ink composition. In yet some other examples, resin may represent from about 35 to about 70 wt % of the total amount of solids present in the ink composition.

The liquid electrophotographic composition includes an optical brightening agent (OBA). Optical brightening agents are typically used to improve whiteness and/or brightness of a media. An OBA absorbs ultraviolet light and re-emits blue light and so is a fluorescent compound. The blue light is added to the reflected light of the media. The media appears less green and/or yellow because more blue light is reflected.

An OBA is also commonly referred to as a fluorescence whitening agent (FWA). It has been recognised that inclusion of an optical brightening agent into a transparent or non-pigmented liquid electrophotographic composition allows an inline determination of the coat weight or thickness of the printed composition based on the fluorescence profile of the optical brightening agent. References in this disclosure to the fluorescence profile of the optical brightening agent are to the difference between the fluorescence emission of the unprinted substrate and the fluorescence of a liquid electrophotographic composition as described herein printed on the substrate.

Basic classes of OBA that can be used in the composition of the present disclosure include triazine-stilbenes, coumarins, imidazolines, diazoles, triazoles, benzoxazolines, and biphenyl-stilbenes. Different OBAs are commercially available from a number of sources, including BASF Corporation Clariant Corporation, and the like. Tinopal® SFP is the trade name of an OBA commercially available from BASF Corporation. Leucophor® NS is the trade name of an anionic OBA commercially available from Clariant Corporation. Other examples of OBAs include Megawhite DT, Megawhite 2B, Megawhite WHN, Megawhite DMX (from Meghmani Dyes and Intermediates Ltd, India), Uvitex OB.

In one example, the liquid electrophotographic composition described herein is used to determine coat weight by adding the composition to a transparent LEP composition to be printed. The OBA is present in the liquid electrophotographic composition in an amount sufficient to allow determination of a fluorescence profile once the composition has been mixed with the transparent LEP composition and printed.

The OBA can be present in the liquid electrophotographic composition in an amount of at least 5.0 wt % based on the total solids of the composition. In another example, the OBA can be present in the liquid electrophotographic composition in an amount of at least 10 wt % based on the total solids of the composition. In another example, the OBA can be present in the liquid electrophotographic composition in an amount of at least 15 wt % based on the total solids of the composition. In another example, the OBA can be present in the liquid electrophotographic composition in an amount of at least 20 wt % based on the total solids of the composition. In another example, the OBA can be present in the liquid electrophotographic composition in an amount of at least 30 wt % based on the total solids of the composition. In another example, the OBA can be present in the liquid electrophotographic composition in an amount of at about 40 wt % based on the total solids of the composition.

In another example, the OBA can be present in the liquid electrophotographic composition in an amount less than 40 wt % based on the total solids of the composition. In another example, the OBA can be present in the liquid electrophotographic composition in an amount less than 30 wt % based on the total solids of the composition. In another example, the OBA can be present in the liquid electrophotographic composition in an amount less than 20 wt % based on the total solids of the composition. In another example, the OBA can be present in the liquid electrophotographic composition in an amount less than 15 wt % based on the total solids of the composition. In another example, the OBA can be present in the liquid electrophotographic composition in an amount less than 10 wt % based on the total solids of the composition. In another example, the OBA can be present in the liquid electrophotographic composition in an amount of about 5 wt % based on the total solids of the composition.

The liquid electrophotographic composition comprising the OBA may be used in an amount such that, when mixed with a transparent LEP composition to be printed, the OBA may be present in an amount from 0.1% wt. to 2.0% wt based on the total solids content of the mixed composition. In another example, the composition described herein may be used in an amount such that the OBA is present in the mixed liquid electrophotographic composition from 0.1% wt. to 1.5% wt based on the total solids content of the composition. Further, the composition described herein may be used in an amount such that the OBA is present in the mixed liquid electrophotographic composition from 0.3% wt. to 1.0% wt based on the total solids content of the composition.

In another example, the composition described herein may be used in an amount such that the OBA is present in the mixed liquid electrophotographic composition in an amount less than 5.0 wt % based on the total solids of the composition. In another example, the composition described herein may be used in an amount such that the OBA is present in the mixed liquid electrophotographic composition in an amount less than 2.0 wt % based on the total solids of the composition. In another example, the composition described herein may be used in an amount such that the OBA is present in the mixed liquid electrophotographic composition in an amount less than 1.8 wt % based on the total solids of the composition. In another example, the composition described herein may be used in an amount such that the OBA is present in the mixed liquid electrophotographic composition in an amount less than 1.7 wt % based on the total solids of the composition. In another example, the composition described herein may be used in an amount such that the OBA is present in the mixed liquid electrophotographic composition in an amount less than 1.6 wt % based on the total solids of the composition. In another example, the composition described herein may be used in an amount such that the OBA is present in the mixed liquid electrophotographic composition in an amount less than 1.5 wt % based on the total solids of the composition.

The liquid electrophotographic composition may contain a charge director. The charge director can be added to the carrier liquid in order to maintain sufficient electrostatic charge on the optical brightening agent particles. For example, the charge components can be nanoparticles of a simple salt and a sulfosuccinate salt of the general formula $MA_n$, wherein M is a metal, n is the valence of M, and A is an ion of the general formula $[R_1—O—C(O)CH_2CH(SO_3^-)C(O)—O—R_2]$ where each of $R_1$ and $R_2$ is an alkyl group, or other charge component as found in WO 2007/130069. Additionally, charge director compounds include ionic compounds, particularly metal salts of fatty acids, metal salts of sulfo-succinates, metal salts of oxyphosphates, metal salts of alkyl-benzenesulfonic acid, metal salts of aromatic carboxylic acids or sulfonic acids, as well as zwitterionic and non-ionic compounds, such as polyoxyethylated alkylamines, lecithin, polyvinylpyrrolidone, organic acid esters of polyvalent alcohols, etc. The charge director used herein can be any as known in the art such as described in U.S. Pat. No. 5,346,796.

The charge director may be present in an amount representing from about 0.001 to about 5 weight percent (wt %) of the total amount of solids present in the composition, i.e. wt % of total weight of non volatile substances (NVS). The charge director may be present in an amount representing from about 0.01 to about 0.5 wt % of the total amount of solids present in the composition.

The liquid electrophotographic composition may include a charge adjuvant. The charge adjuvant may include, but is not limited to, barium petronate, calcium petronate, Co salts of naphthenic acid, Ca salts of naphthenic acid, Cu salts of naphthenic acid, Mn salts of naphthenic acid, Ni salts of naphthenic acid, Zn salts of naphthenic acid, Fe salts of naphthenic acid, Ba salts of stearic acid, Co salts of stearic acid, Pb salts of stearic acid, Zn salts of stearic acid, Al salts of stearic acid, Zn salts of stearic acid, Cu salts of stearic acid, Pb salts of stearic acid, Fe salts of stearic acid, metal carboxylates (e.g., Al tristearate, Al octanoate, Li heptanoate, Fe stearate, Fe distearate, Ba stearate, Cr stearate, Mg octanoate, Ca stearate, Fe naphthenate, Zn naphthenate, Mn heptanoate, Zn heptanoate, Ba octanoate, Al octanoate, Co octanoate, Mn octanoate, and Zn octanoate), Co lineolates, Mn lineolates, Pb lineolates, Zn lineolates, Ca oleates, Co oleates, Zn palmirate, Ca resinates, Co resinates, Mn resinates, Pb resinates, Zn resinates, AB diblock copolymers of 2-ethylhexyl methacrylate-co-methacrylic acid calcium and ammonium salts, copolymers of an alkyl acrylamidoglycolate alkyl ether (e.g., methyl acrylamidoglycolate methyl ether-co-vinyl acetate), and hydroxy bis(3,5-di-tert-butyl salicylic) aluminate monohydrate. The charge adjuvant may be aluminum stearate or aluminum tristearate. The charge adjuvant may be present in an amount of about 0.1 to 5, about 0.5 to 4, and about 1 to 3% weight of the liquid electrophotographic composition.

The liquid electrophotographic composition may also contain a fluorescence adjuvant. The fluorescence adjuvant increases the visible blue light emissions significantly and so enhances the fluorescence profile of the optical brightening agent in the liquid electrophotographic composition. The fluorescence adjuvant may be an organic polyol. Examples of suitable polyols include high molecular weight polyethylene glycol or polyvinyl alcohol. Other examples of organic polyols which can be used as a fluorescence adjuvant include maltose monohydrate, sucrose, dextrin and sorbitol.

The liquid electrophotographic composition may contain a fluorescence adjuvant in an amount of at least 20 wt % of the total amount of solids present in the composition. The liquid electrophotographic composition may contain a fluorescence adjuvant in an amount of at least 25 wt % of the total amount of solids present in the composition. The liquid electrophotographic composition may contain a fluorescence adjuvant in an amount of at least 30 wt % of the total amount of solids present in the composition. The liquid electrophotographic composition may contain a fluorescence adjuvant in an amount of at least 40 wt % of the total amount of solids present in the composition. The liquid electrophotographic composition may contain a fluorescence adjuvant in an amount of about 50 wt % of the total amount of solids present in the composition.

The liquid electrophotographic composition may contain a fluorescence adjuvant in an amount of less than 50 wt % of the total amount of solids present in the composition. The liquid electrophotographic composition may contain a fluorescence adjuvant in an amount of less than 40 wt % of the total amount of solids present in the composition. The liquid electrophotographic composition may contain a fluorescence adjuvant in an amount of less than 30 wt % of the total amount of solids present in the composition.

The liquid electrophotographic composition may contain a fluorescence adjuvant in an amount of less than 25 wt % of the total amount of solids present in the composition. The liquid electrophotographic composition may contain a fluorescence adjuvant in an amount of about 20 wt % of the total amount of solids present in the composition.

The liquid electrophotographic composition may also contain others additives such as a surface modifier, compatibility additives, a viscosity control agent, media additives, fixing additives and other additives. A viscosity control agent assists in maintaining viscosity of starting materials combined in a resin grinding and optical brightening agent dispersion process to adequately reduce particle size. During the processing, depending on physical properties of the resin and optical brightening agent and the operating conditions for grinding, optical brightening agent may become encapsulated by resin when loading it on the resin, though encapsulation is not required. A viscosity control agent may be selected that, after grinding, also functions as a charge adjuvant.

The liquid electrophotographic compositions of the present disclosure can also be suitable for use on many types of substrates of recording media, including but not limited to vinyl media, cellulose-based paper media, various cloth materials, polymeric materials (non-limitative examples of which include polyester white film or polyester transparent film), photopaper (non-limiting examples of which include polyethylene or polypropylene extruded on one or both sides of paper), metals, and/or mixtures or composites thereof.

In another example, a method of manufacturing a liquid electrophotographic composition as described herein can comprise grinding a carrier liquid, a polymer resin and an optical brightening agent to form the liquid electrophotographic composition.

In the present method, the grinding can be performed from 1 hour to 30 hours. In one example, the grinding can be performed less than 30 hours. In one example the grinding can be performed for about 24 hours. Additionally, the grinding can be performed at less than 1000 rpm. The grinding can also be performed at a temperature from 20° C. to 60° C. In one example, the temperature can be from 25° C. to 50° C. In one example, the temperature can be about 25° C.

In one example of the present method, the carrier liquid and the polymer resin may be in the form of an off-the-shelf or prior-prepared electrophotographic paste composition, to which the optical brightening agent is added. For example, the method of manufacturing a liquid electrophotographic composition may comprise grinding an optical brightening agent with an electrophotographic paste composition, the electrophotographic paste composition comprising a carrier liquid and a polymer resin. The prior-prepared electrophotographic paste composition may comprise additives such as charge directors, charge adjuvants and viscosity modifiers as hereinbefore described. The method may comprise grinding a carrier liquid, a polymer resin, a charge adjuvant and an optical brightening agent to form the liquid electrophotographic composition.

In another example, the use of the liquid electrophotographic compositions described herein to determine coating weight of a printed transparent LEP composition is provided.

EXAMPLES

The following examples are to be understood as being only exemplary or illustrative of the application of the principles of the present disclosure. Numerous modifications and alternative compositions and methods may be devised by those skilled in the art without departing from the spirit and scope of the present disclosure. Thus, these examples should not be considered as limitations of the present disclosure, but are merely in place to teach how to make and use compositions of the present disclosure.

Many printing papers contain brightening agents. In order to minimise fluorescence from the tested substrate and to demonstrate the correlation between fluorescence of the printed film (comprising the optical brightening agent) and the coat weight or thickness of the film, the liquid electrophotographic compositions of the present disclosure were printed onto a substrate which had been pre-printed with four layers of a cyan liquid electrophotographic ink (HP Indigo ElectroInk Cyan®).

Fluorescence was determined using a PerkinElmer® LS45 luminescence spectrometer. Excitation wavelength was 350 nm where fluorescence was measured at 450 nm. As mentioned above, fluorescent intensity is measured in RFU (relative fluorescent units). In order to exclude the effect of the fluorometer, a photochemically fluorescent stable standard was used as a reference. All the fluorescence values reported are relative to the fluorescence values of the standard measured before each experiment. The standard used was USFS-205-020 from Labsphere (N.H., USA).

Coat weight of printed compositions was evaluated gravimetrically. 10, 15 and 20 layers of the tested transparent composition were printed. The ink layers were peeled from the substrate after printing and their mass and area were determined after drying overnight in a vacuum oven at room temperature. For complete removal of the printed composition the test composition was printed on a special substrate, DIGIPRINT-IG/WOSK from Folex. In addition, two layers of HP Indigo Yellow ElectroInk® were printed prior to the transparent test composition. The coat weight of the yellow ink was determined separately and was subtracted from the coat weight of the tested transparent composition. Coat weight of a single printed layer of the printed composition was calculated by dividing the coat weight by the number of layers printed. Coat weights of a single layer calculated from the 10, 15 and 20 layers were identical.

Example 1

58.5 g of polymer resin (DuPont's Nucrel® 699 and Honeywell's A-C 5120 resins in a ratio of 4:1; swollen with Isopar™ L, from ExxonMobil; 40% solids), 12 g. fluorescent adjuvant (maltose monohydrate, from Sigma Aldrich) 1.8 g charge adjuvant (aluminum stearate, from Sigma Aldrich), and 4 g of optical brightening agent (Megawhite DT, from Meghmani Dyes and Intermediates Ltd. India) and 124.9 g of Isopar™ L were grinded for 24 h at 25° C. using a laboratory 01HD attritor from Union Process (USA). After grinding, the fluorescent concentrate was diluted with the carrier liquid (Isopar™ L) to level of 5% solids to give fluorescent concentrate 1.

62 g of the concentrate 1 and 93 g of carrier liquid (Isopar™ L) were added to an ink tank of an HP Indigo 7000 press, containing 1400 g of a 2% solid dispersion of HP Indigo ElectroInk Transparent®. After 5 min. of mixing, the ink was printed at a print speed of 2 m/sec and a blanket temperature of 100° C. As mentioned above the transparent composition containing the optical brightening agent was printed on top of 4 layers of cyan Electrolnk® to eliminate fluorescence from the paper substrate.

The fluorescence was calculated according to equation 1, in which "ink" refers to the printed composition and "background" refers to the test substrate:

Reported fluorescence Intensity [%]=(Fluorescence ink−Fluorescence background)/Fluorescence Labsphere reference*100    Equation 1

For coat weight determination, 10, 15 and 20 layers of the tested ink were printed and peeled of the substrate. The mass and the area were determined and the coat weight of a single layer was calculated as described above. The resultant calibration curve is presented in FIG. 1.

Figure 1:
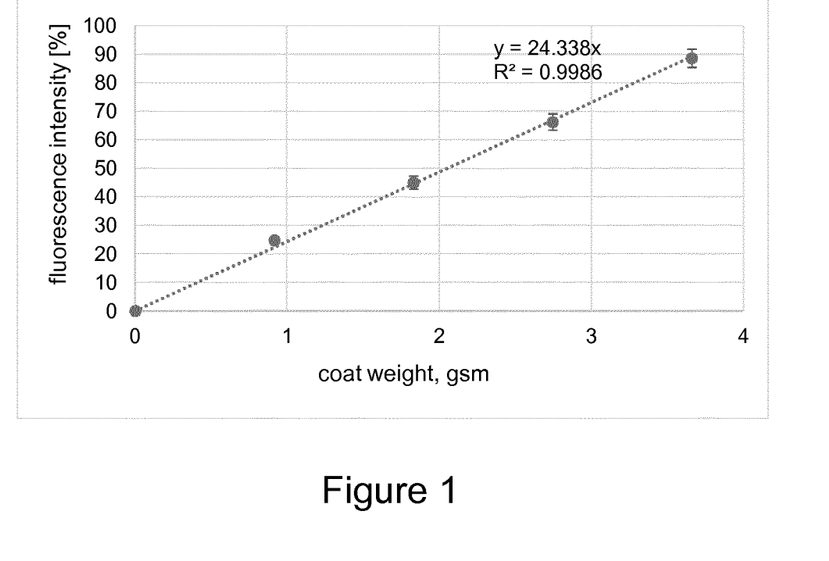
FIG. 1 shows the correlation between the coat weight of a printed transparent or colourless electrophotographic composition according to Example 1 and measured fluorescence.

Validation of the calibration curve was performed by preparation of a different batch of HP Indigo Transparent Electrolnk® containing concentrate 1 as described in this example. The tested ink was printed and the coat weight of 1 layer of ink was compared to the coat weight obtained from the fluorescence measurements using the calibration curve. Coat weight determined gravimetrically was 0.68 gsm, while the coat weight calculated from fluorescence measurements was 0.70 gsm Example 2

Concentrate 2 was prepared using a 1-S attritor. 672.75 grams of Nucrel® 699 paste from DuPont (40% solids), 138 g fluorescent adjuvant (sucrose, from Sigma Aldrich), 6.9 g charge adjuvant (aluminum stearate, from Sigma Aldrich), 46 g of optical brightening agent (Megawhite DT, from Meghmani Dyes and Intermediates Ltd. India) and 127.9 g of Isopar™ L (ExxonMobil) were grinded for 24 h at 25° C. The ink was diluted to 5% by the carrier liquid.

A test ink was prepared, by grinding 1076 grams of polymer resin (Nucrel® 699 from DuPont and A-C 5120 from Honeywell in a ratio of 4:1; swollen with Isopar™ L; 25% solids), 184 g maltose monohydrate (from Sigma Aldrich) 6.9 g aluminum stearate (from Sigma Aldrich) and 1032 g of Isopar™ L for 24 h at 25° C. using an 1-S attritor from Union Process (USA). The ink was diluted to 2% solids by the carrier liquid. 62 g of concentrate 2 (5% solids) and 93 g of Isopar™ L were added to 1400 g of 2% solids dispersion of the ink.

Figure 2:
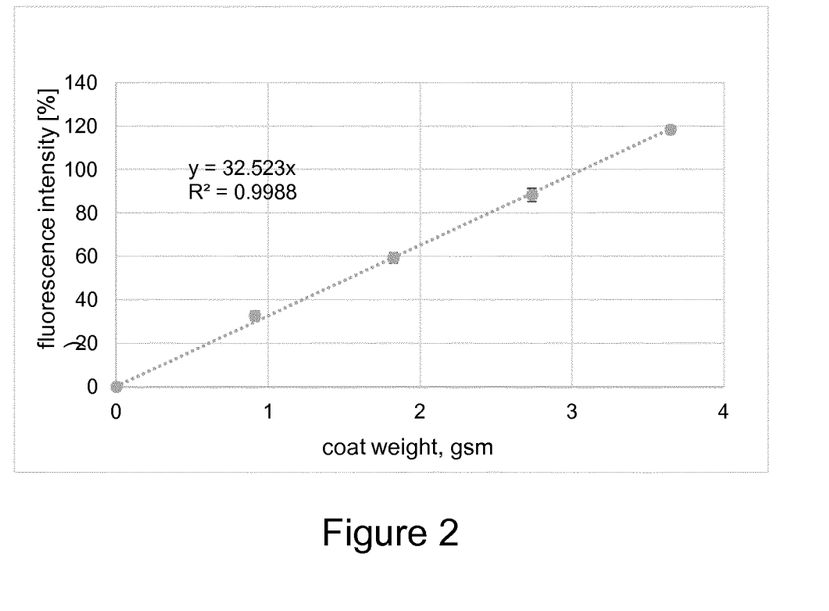
FIG. 2 shows the correlation between the coat weight of a printed transparent or colourless electrophotographic composition according to Example 2 and measured fluorescence.

The ink was printed on an HP Indigo 7000 press after 5 min. of mixing, at a print speed of 2 m/sec and a blanket temperature of 100° C. As mentioned above the transparent composition containing the optical brightening agents was printed on top of 4 layers of HP Indigo Electrolnk Cyan® to eliminate fluorescence from the paper substrate. The fluorescence was calculated according to equation 1. For coat weight determination, 10, 15 and 20 layers of the tested ink were printed and peeled of the substrate. The mass and the area were determined and the coat weight of a single layer was calculated as described above. The resultant calibration curve is found in FIG. 2.

Validation of the calibration curve was performed by preparation of a different R&D transparent LEP ink containing concentrate 2 as described in this example. The tested ink was printed and the coat weight of 1 layer of ink was compared to the coat weight obtained from the fluorescence measurements using the calibration curve. Coat weight determined gravimetrically was 0.91 gsm, while the coat weight calculated from fluorescence measurement was 0.92 gsm.

Example 3

Figure 3:
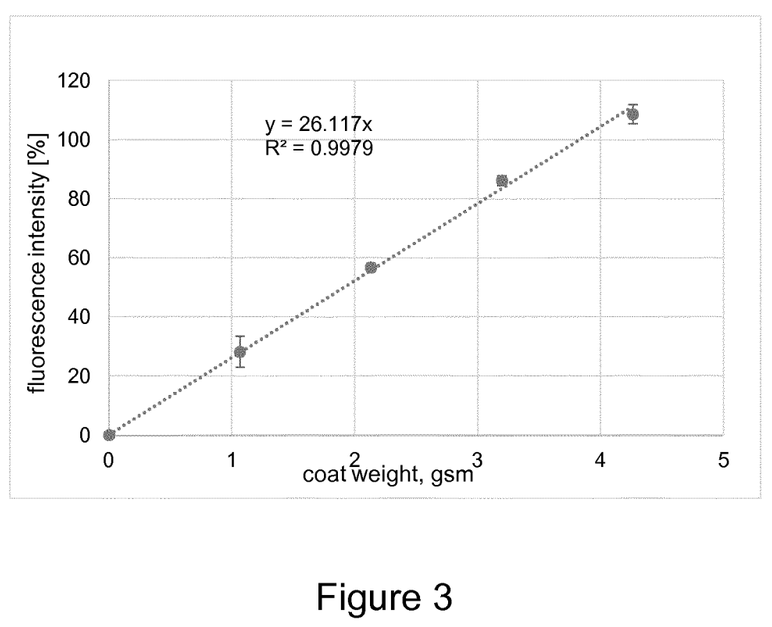
FIG. 3 shows the correlation between the coat weight of a printed transparent or colourless electrophotographic composition according to Example 3 and measured fluorescence.

53.5 g of Nucrel® 699 (40% solids, from DuPont), 12 g of maltose monohydrate (from Sigma Aldrich), 6 gr of Megawhite DT (from Meghmani Dyes and Intermediates Ltd. India), 0.6 g of aluminum stearate (Sigma Aldrich) and 127.9 gr of Isopar™ L (ExxonMobil) were grinded for 24 h at 25° C. using a laboratory 01HD attritor from Union Process (USA). After grinding, the mixture was diluted with the carrier liquid (Isopar™ L) to a level of 5% solids to give fluorescent concentrate 3. 40 g of the concentrate 3 and 60 g of carrier liquid were added to an HP Indigo 7000 Press ink tank containing 1400 g of a 2% solid dispersion of HP Indigo Electrolnk Transparent® After 5 min. of mixing, the composition was printed at a print speed of 2 m/sec and a blanket temperature of 100° C. As mentioned above, the transparent composition containing the optical brightening agent was printed on top of 4 layers of cyan Electrolnk® to eliminate fluorescence from the paper substrate. The fluorescence was calculated according to equation 1. For coat weight measurement, 10, 15 and 20 layers of the tested composition were printed and peeled from the substrate. The mass and the area were determined and the coat weight of a single layer was calculated as described above. The resultant calibration curve is found in FIG. 3.

Validation of the calibration curve was performed by preparation of a different batch of HP Indigo Electrolnk® containing concentrate 3 as described in this example. The tested composition was printed and the coat weight of 3 layers was compared to the coat weight obtained from the fluorescence measurements using the calibration curve. Coat weight determined gravimetrically was 1.05 gsm, while the coat weight calculated from fluorescence measurement was 1.10 gsm.

While the present disclosure has been described with reference to certain embodiments, those skilled in the art will appreciate that various modifications, changes, omissions, and substitutions can be made without departing from the spirit of the disclosure. It is intended, therefore, that the disclosure be limited only by the scope of the following claims. The features of any dependent claim can be combined with the features of any of the other dependent claims, and any independent claim.

The invention claimed is:

1. A liquid electrophotographic composition, comprising:
   a carrier liquid;
   a polymer resin comprising a copolymer of an alkylene monomer and a monomer selected from acrylic acid and methacrylic acid; and
   an optical brightening agent present in amount from 0.1 wt % to less than 20 wt %, based on the total solids content of the composition;
   wherein the liquid electrophotographic composition is a colorless liquid electrophotographic composition.

2. The liquid electrophotographic composition of claim 1, wherein the liquid electrophotographic composition is a transparent or non-pigmented liquid electrophotographic composition.

3. The liquid electrophotographic composition of claim 1, wherein the optical brightening agent is a colorless colourless optical brightening agent.

4. The liquid electrophotographic composition of claim 3, wherein the optical brightening agent is a fluorophore.

5. The liquid electrophotographic composition of claim 1, wherein the optical brightening agent comprises one or more of a triazine stilbene and derivatives thereof, a biphenyl stilbene and derivatives thereof, a coumarin and derivatives thereof, a benzoxazoline and derivatives thereof, a diazole and derivatives thereof, an imidazoline and derivatives thereof, or mixtures thereof.

6. The liquid electrophotographic composition of claim 1, wherein the composition further comprises a fluorescence adjuvant.

7. The liquid electrophotographic composition of claim 1, wherein the composition further comprises a charge director.

8. The liquid electrophotographic composition of claim 1, wherein the polymer resin comprises a copolymer of ethylene and acrylic acid.

9. The liquid electrophotographic composition of claim 1, wherein the polymer resin comprises a copolymer of ethylene and methacrylic acid.

10. The liquid electrophotographic composition of claim 1, wherein the optical brightening agent is insoluble in the carrier liquid.

11. The liquid electrophotographic composition of claim 6, wherein the fluorescence adjuvant is maltose monohydrate.

12. A method of making the liquid electrophotographic composition of claim 1, comprising grinding:

the carrier liquid;

the polymer resin comprising the copolymer of the alkylene monomer and the monomer selected from acrylic acid and methacrylic acid; and the optical brightening agent, to form the liquid electrophotographic composition.

13. A method of using the liquid electrophotographic composition of claim 1, comprising:

printing the liquid electrophotographic composition to form a printed transparent electrophotographic composition; and determining a coat weight of the printed transparent electrophotographic composition.

14. The method of claim 13 wherein the determining of the coat weight of the printed transparent electrophotographic composition includes determining a fluorescence of the printed transparent electrophotographic composition.

* * * * *